United States Patent [19]
Fisher et al.

[11] Patent Number: 5,444,710
[45] Date of Patent: Aug. 22, 1995

[54] TELECOMMUNICATIONS SYSTEMS

[75] Inventors: David A. Fisher; Paul D. Welton, both of Essex, Great Britain

[73] Assignee: Northern Telecom Limited, Montreal, Canada

[21] Appl. No.: 152,281

[22] Filed: Nov. 12, 1993

[30] Foreign Application Priority Data

Nov. 12, 1992 [GB] United Kingdom ............... 9223750
Jun. 22, 1993 [GB] United Kingdom ............... 9312910

[51] Int. Cl.⁶ ........................................... H04B 7/212
[52] U.S. Cl. .................... 370/95.3; 370/103; 375/206; 375/358
[58] Field of Search ............ 370/17, 18, 95.3, 103, 370/105.1; 359/115, 118, 120, 121; 375/1, 58, 96, 109, 115, 200, 206, 208, 285, 343, 358, 367, 359, 370

[56] References Cited

U.S. PATENT DOCUMENTS 4,642,806  2/1987  Hewitt et al. ................... 370/95.3
4,653,049  3/1987  Shinmyo ........................... 370/103
4,774,708  9/1988  Hotta ............................... 370/95.3
5,267,264  11/1993 Shlenker et al. .................. 375/96

*Primary Examiner*—Benedict V. Safourek
*Attorney, Agent, or Firm*—Lee, Mann, Smith, McWilliams, Sweeney & Ohlson

[57] ABSTRACT

A method for marshalling an additional outstation (3) of a time division multiple access (TDMA) telecommunication system including a basestation (4) and a plurality of outstations (1,2), such as a passive optical network (PON). A sequence is transmitted from the additional outstation (3) to the basestation (4) at a level below the noise sensitivity of a receiver (49) of the basestation (4), detected at the base station and its phase determined by a correlation process. From the phase the loop delay to the additional outstation is determined and the outstation instructed to realign its transmission accordingly. The sequence is a short length sequence and the correlation can be performed by a binary division search method or a lowest common multiple method (FIG. 1).

8 Claims, 11 Drawing Sheets

| Length of Sequence, s (Bits) | Sequence (Hexadecimal) | Autocorrelation in non-aligned positions |
|---|---|---|
| 7 | 0000000B | 3 |
| 11 | 00000097 | 5 |
| 13 | 00000053<br>0000008D | 7 |
| 15 | 00000537 | 7 |
| 19 | 00005793 | 9 |
| 23 | 000299AF | 11 |
| 31 | 023A979B<br>0263CADD<br>032DEA27<br>048DBC57 | 15 |

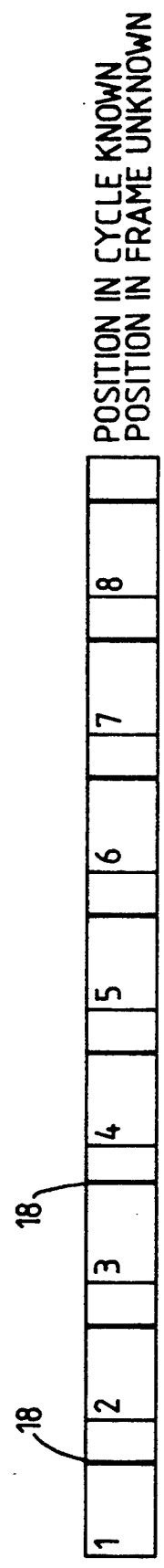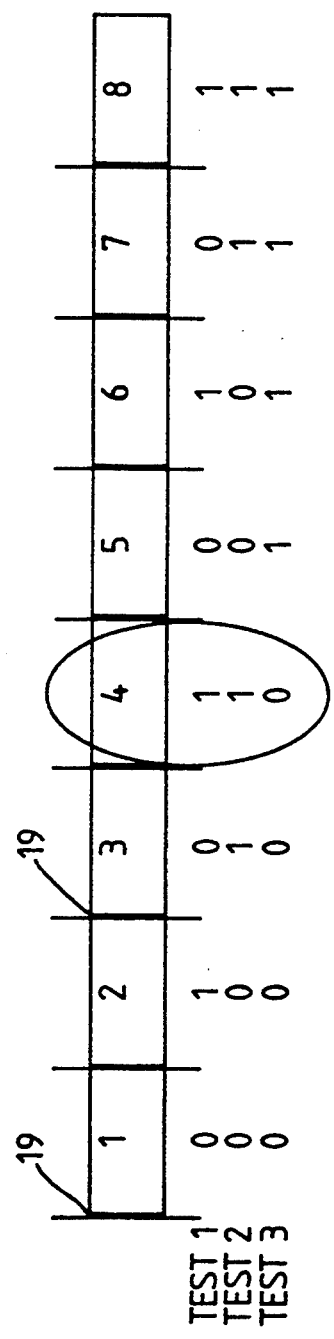
Fig. 4.

Fig.9.
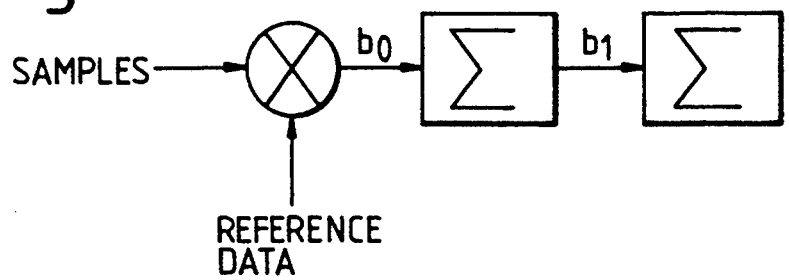
Fig.10.
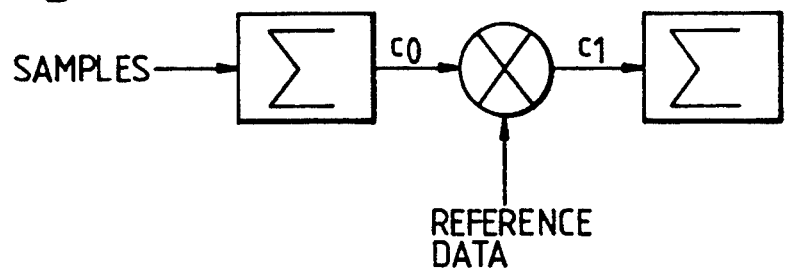
Fig.11.
| Over-Sampling Factor<br><br>$n$ | Correlation Sum Proportion<br><br>$S_n$ | Increase in Correlation Sum Deviation from 50%<br><br>$\dfrac{S_n - 0.5}{S_1 - 0.5}$ | Maximum Integration Period<br><br>$\dfrac{9 * n}{(S_n - 0.5)^2}$ | Increase in Maximum Integration Period<br><br>$\dfrac{n * (S_1 - 0.5)^2}{(S_n - 0.5)^2}$ |
|---|---|---|---|---|
| 1 | 0.500968 | 1.000000 | 9606190 | 1.000000 |
| 2 | 0.500968 | 1.000000 | 19212380 | 2.000000 |
| 3 | 0.501452 | 1.499998 | 12808285 | 1.333337 |
| 4 | 0.501452 | 1.499998 | 17077714 | 1.777782 |
| 5 | 0.501815 | 1.874995 | 13662205 | 1.422229 |
| 6 | 0.501815 | 1.874995 | 16394646 | 1.706675 |
| 7 | 0.502117 | 2.187492 | 14052589 | 1.462868 |
| 8 | 0.502117 | 2.187492 | 16060102 | 1.671849 |
| 9 | 0.502382 | 2.460925 | 14275682 | 1.486092 |

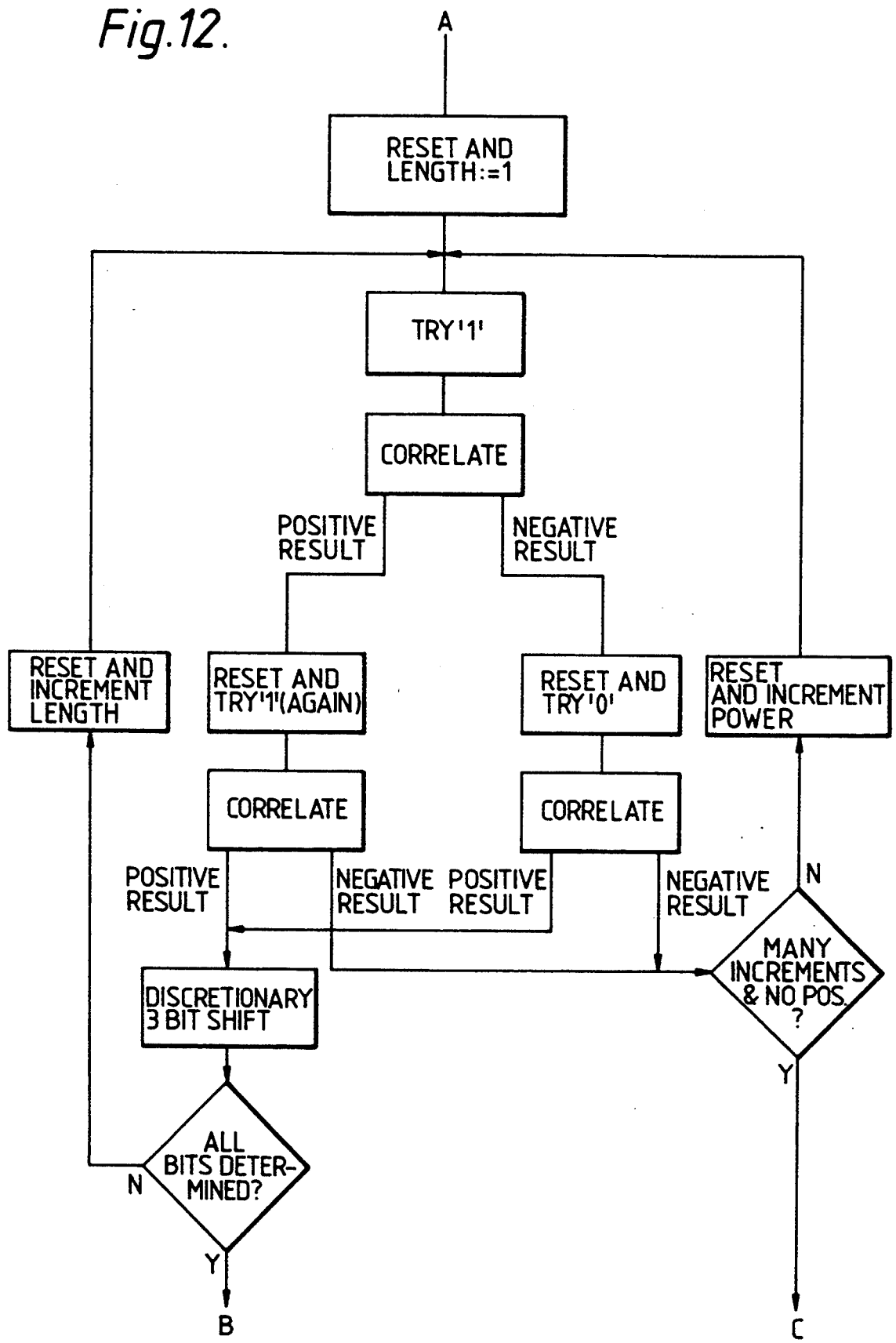

TELECOMMUNICATIONS SYSTEMS

This invention relates to telecommunications systems and in particular to systems employing the time division multiplex/time division multiple access (TDM/TDMA) principle.

BACKGROUND OF THE INVENTION

The TDM/TDMA principle is well known in radio systems or passive optical networks (PONs), where it is employed to permit transmission between a single basestation and a plurality of outstations. In the downstream (basestation to outstation) direction, the information (traffic) is broadcast to all outstations, but upstream it is transmitted in bursts, each of which must be timed to avoid mutual interference (overlap) so that at any time the basestation only receives data from one outstation. When a new outstation is to be connected its time of transmission must be such that it does not interfere with existing traffic transmissions and the processing required to ensure this is referred to as marshalling.

In our co-pending U.S. application Ser. No. 08/152,278 the contents of which are hereby incorporated by reference, there is disclosed a method for measuring and aligning in time the transmissions of a new outstation which eliminates the possibility of it disrupting existing traffic, by employing sequences (pseudo random sequences) at a level below the noise sensitivity of the basestation receiver (for normal traffic). The sequences can be detected using correlation and their phase is used to determine the loop delay to the new outstation.

The present invention is based on the frame alignment process described in the above-mentioned co-pending application and is concerned with various modifications.

SUMMARY OF THE INVENTION

According to the present invention there is provided a method for marshalling an additional outstation of a time division multiple access (TDMA) telecommunications system including a basestation and a plurality of outstations, the method being characterised by the steps of transmitting from the additional outstation a sequence at a level below the noise sensitivity of a receiver of the basestation, detecting said sequence at the basestation, discriminating the phase of the detected sequence, said detecting and discriminating being carried out by a correlation process, using the discriminated phase to determine the loop delay to the additional outstation and transmitting phase offset instructions to the additional outstation whereby to align its transmission in a respective transmission window, wherein the sequence is a short length sequence, and wherein the additional outstation transmits its sequence in response to instructions transmitted by the basestation for any additional outstation to so transmit, which instructions include a frame word from which frame boundaries and a time reference are deducible by the additional outstation.

In particular the correlation process may involve a binary division search or a lowest common multiple method, the algorithm for the latter being one which may be implemented using a counter method.

The additional outstation can be provided with a unique identification using modulation of the sequence, and this provides the ability to handle and identify more than one outstation. This can be achieved by modulation of sign or position with or without the addition of a back off method.

The basic correlation process can be accelerated by the use of different outstation levels in the control loop or use of outstation laser (transmitter) ramping. Care must be taken to detect at a level before the data (traffic) bit rate is damaged.

Various simplified correlator schemes are presented which operate on an integrate and dump prefiltering (bit, word) regime, and parallel and serial equivalent implementations (counter versus counter and adders in the parallel domain).

BRIEF DESCRIPTION OF THE DRAWINGS

Embodiments of the present invention will now be described with reference to the accompanying drawings, in which:

FIG. 4 illustrates a binary search method;

FIG. 9 shows a first variant of correlator configuration which covers pre-integration of match results;

FIG. 10 shows a second variant of correlator configuration, which covers pre-integration of incoming bit value;

FIG. 11 is a table indicating the affect of truncating integration precision;

FIG. 12 is a flow diagram for acquisition of the identity of an outstation;

FIGS. 13a and 3b together shown a circuit for adjusting the byte phase of the upstream data;

DESCRIPTION OF PREFERRED EMBODIMENT

Though the present invention is described hereinafter with reference to a PON network, it should be understood that the principles involved are, however, equally applicable to a radio network or a twisted pair or coaxial cable network operating on TDMA principles.

Figure 1:
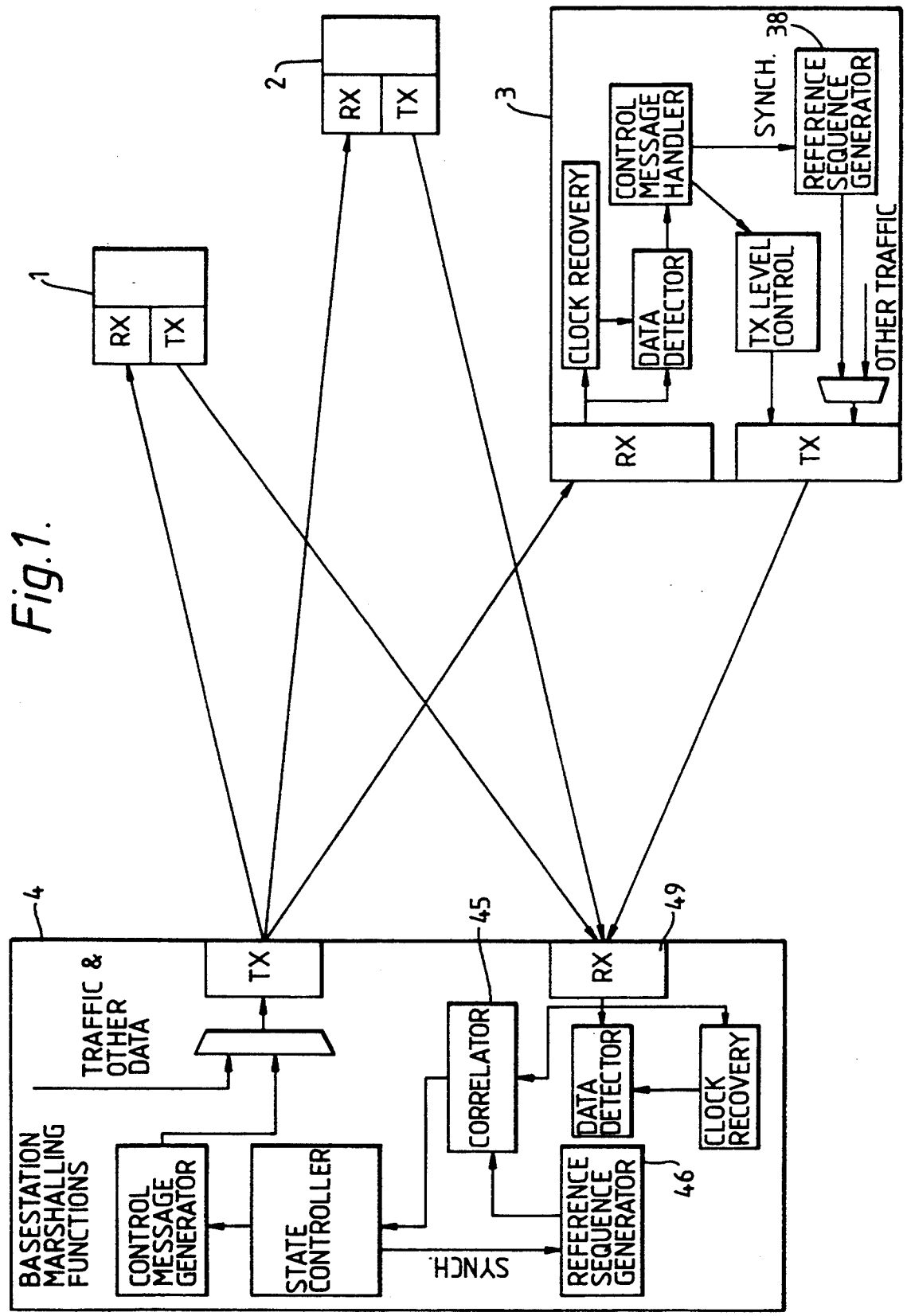
FIG. 1 illustrates a PON network to which the invention is applicable.

The network illustrated in FIG. 1 comprises a basestation 4 and three outstations 1, 2 and 3. Outstation 3 is drawn more explicitly than outstations 1 and 2 and may be considered as an outstation which is to be marshalled. This network and its function is described in greater detail in the above-mentioned co-pending application and is presented in this application simply to show a basic PON network.

The marshalling process disclosed in the above mentioned patent application is based on the transmission from the outstation to the basestation of a very low level pseudo random sequence (PRS) generated at the outstation (generator 38). The level of the signal is so low that it falls below the threshold of detectability of the receiver 49 of the basestation and does not interfere with the other transmissions. The sequence is a continuous pseudo random sequence. The basestation thus receives relatively large data (traffic) signals and a signal which is comparable with or below the noise floor of the receiver. A correlator 45 at the basestation serves to correlate the received PRS and the same PRS generated at the basestation (generator 46) for each possible positions of the sequence and determines the delay from the phase of the received PRS. In the case of a $2^9$ PRS there are 511 positions. Either one correlator can be used for all 511 positions or there can be 511 correlators which are used once.

Figures 2, 3:
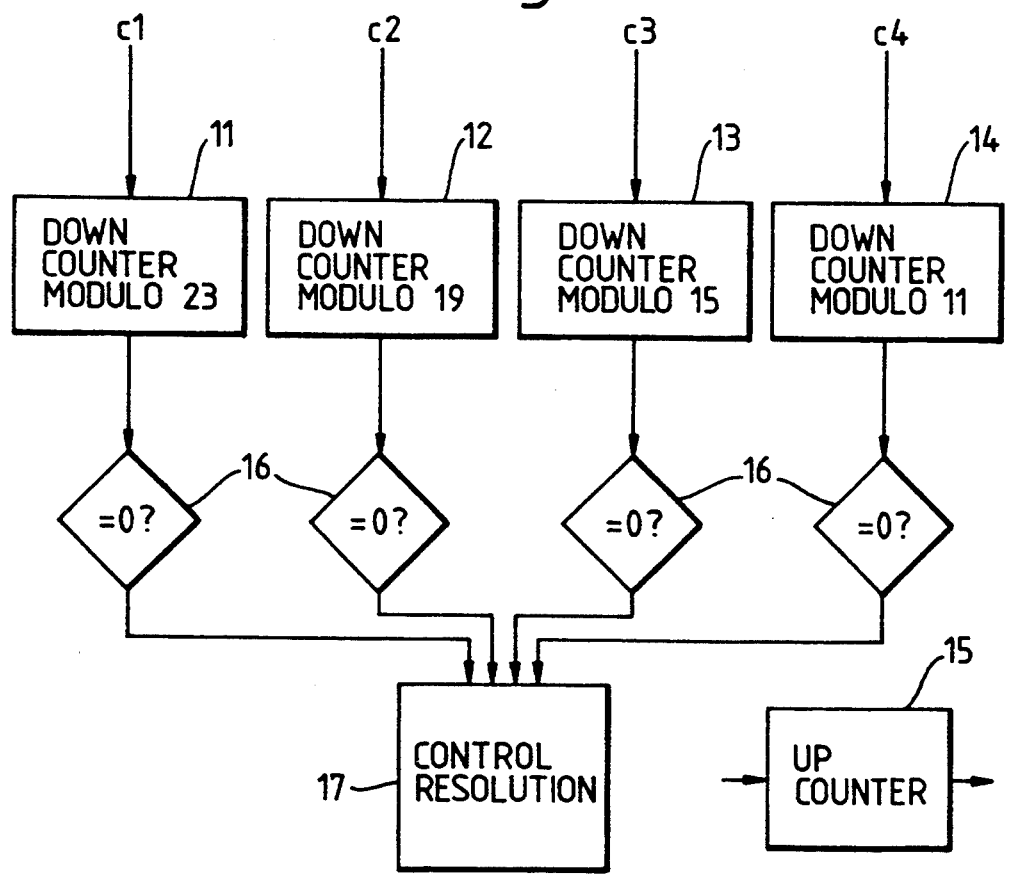
FIG. 2 is a table quoting suitable short sequences.
FIG. 3 illustrates a circuit for deducing round trip delay.

The location process can be accelerated by using shorter sequences than those proposed in the co-pending application with a binary division search or a lowest common multiple method. FIG. 2 shows examples of suitable short sequences. In a particular application we propose to use four sequences, one of 23 bits, one of 19 bits, one of 15 bits and one of 11 bits to measure the propagation delay with a range of up to the lowest common multiple of the lengths of these four sequences i.e. 72105 bit periods. In this case 23 correlators only are required in comparison with a possible 511 of the basic method. This allows for each of the four sequences to find the alignment position and thus gives four values from which to deduce the propagation delay.

In general terms, the lowest common, multiple of sequence lengths process for determining the round trip propagation delay from the basestation to the outstation and back consists of several stages. In each stage the outstation is asked to transmit repeatedly to the basestation a sequence of bits of a specified length and content, so that the transmission of the last bit of the sequence in one instance of transmission is succeeded by the transmission of the first bit of the sequence in the subsequent instance of the sequence. By this procedure a continuous sequence is output and this continues until the basestation instructions the outstation differently.

During transmission of each specified sequence by the outstation, the basestation performs the correlation procedure. This yields a value which is assumed to be the remainder resulting from the mathematical division of the propagation delay by the number of bits in the sequence. This method allows the propagation delay to be determined absolutely provided that it is known to be less than the lowest common multiple of the lengths for each of the sequences used. For example, with four steps in which sequences of lengths 11, 15, 19 and 23 bits are each used, then the propagation delay may be determined absolutely provided that it is known to be less than 72105 bit periods. The means to deduce the propagation delay d from the individual remainders is as follows. Suppose the basestation correlates sequences of lengths s1, s2, s3 etc. When the basestation correlates a sequence of length s1, and correlator c1 reaches its threshold, it has determined that the propagation delay is $a1*s1+c1$, where a1 is integral Suppose that the process is repeated with each of the other sequences which yields values c2, c3 and so on, then it has been determined that the propagation delay also equals the following expressions:

$a2*s2+c2$, where a2 is integral $a3*s3+c3$, where a3 is integral and so on for each of the sequences.

The value of d is then deduced from the values c1, c2, c3 etc. using an algorithm described below in terms of the means necessary to implement it shown in FIG. 3. A counter for each of the sequences used, which have lengths s1, s2, s3, s4, etc., is provided, these are counters 11, 12, 13 and 14. These counters count downwards from preset values modulus s1, s2, s3, s4 etc., respectively. They are initially preset with the values c1, c2, c3, c4 etc., respectively. Another counter, up counter 15, is preset to zero. All the counters are then advanced together. Whilst they are being advanced, the logic blocks 16 detect when one of the counters reaches zero. The logic block 17 detects when all the down counters reach zero simultaneously. At this point the process is complete and the propagation delay may be found in the up counter 15.

The algorithm may be implemented using either an electronic circuit employing digital techniques or by the programming of a general purpose digital computer. While reference has been made to "counters", "up counters", "count downwards", "preset values" and "logic blocks"; the construction and use of these primitive circuit elements will be readily apparent to those skilled in the art of digital circuit construction or the programming of computers.

An alternative algorithm for deducing the propagation delay is now presented which is expressed as a fragment of a software program written in the language 'C'. The implementation of algorithms represented in this form by executing this program on a computer system is commonplace, and will be readily apparent to one of ordinary skill in the field of microprocessor engineering.

The following program steps are executed:

tmp 1=solveCyclic (s1, s2, c1, c2);

tmp 2=solveCyclic (s3, s4, c3, c4);

propagation Delay=solveCyclic (s1*s2, s3*s4, tmp 1, tmp 2);

The call to the software routine solve cyclic results in a call to the following code:

```
unsigned int solve (f, g, h)
unsigned int f, g, h;
[This function returns the solution (e) to the equation
(ef) % g = h, by a recursive algorithm which reduces the
problem to successive equations of similar form, with strictly
reducing values for f and h. Eventually f = 1 and the equation
may be solved by evaluating a formula]
{
  return ((
      (((unsigned int) (g / f)) + 1)*
      ((f − g % f) = = 1?
          h % f
          solve (f − g % f,
              g,
              h % f))
      ) % g +
      (unsigned int) (h / f));
};
unsigned int solveCyclic (p, q, m, n)
unsigned int p, q, m, n;
[This function solves the equations for h, where
```

```
                                -continued
h = ep + m = fq + n. The problem is reduced from the
problem of solving two equations with two unknowns to a
single equation with one unknown. If ep + m = fq + n, then
ep % q = n − m, or fq % p = m − n. The equation to solve is
chosen so that the remainder is positive].
{
    return (m >= n?
        solve (q, p, m − n) *q + n:
        solve (p, q, n − m) * p + m);
};
```

In the binary division search method, the basic marshalling method of the above-mentioned co-pending application is applied but using a sequence of a short length for which it is practical to check each alignment position in turn or ,concurrently by replicating the correlator device so that one is available for each position. On its own this will give the distance as a certain value plus an unknown integral multiple of the period of the short sequence. This distance may be discovered using the same implementation. After the initial detection has been performed a second stage occurs during which the outstation continues to output the sequence but inverts every other instance of the sequence. The effects of this will be more readily understood from consideration of FIG. 4 and the following.

To perform the binary division search method the outstation shall transmit a sequence repeatedly. In this example the length shall be 63 bits. While the above-mentioned patent application enables the position to be found within 63 bits, the present invention extends this, in this example to 8 cycles of 63 bits or 504 bits.

The basestation detects the outstation correlation sequence and determines the relative position in the cyclic correlation sequence. These positions correspond to lines 18 in the upper part of FIG. 4. So far the position in the cycle has been determined but the position in the frame is unknown. In order to determine the position in the frame, the outstation is instructed firstly to shift the phase of the sequence so that the relative position is moved to the start of the cycle 19 in the lower part of FIG. 4, and secondly to repeat the correlation log 2N additional times in each of which the transmitted and reference sequences are modified as described below. In the description below these additional steps are referred to as "tests". In this case three tests are needed. The first test consists of inverting the sequence applied every other time. This is indicated as 01010101 (0 indicating inverted, 1 indicating non-inverted). If the correlation detector gives an answer the right way up this corresponds to an even position, and if the wrong way up this corresponds to an odd position. In a second test, different binary search, the inversion is 00110011 and thus the search is to whether in first two or second two for position 4. The third test is 00001111 and the search is whether in first or last four for position 4. What is actually occurring is binary division and instead of requiring 8 searches only 3 are needed in view of consideration of the results of these three tests. For position 4 test one needs to have a positive result, test two a positive result and test 3 a negative result.

A problem fundamental to a Time Division Multiple Access System is the conflict which arises when two outstations attempt to begin communication with the basestation simultaneously.

A process by which the conflict can be resolved consists of a number of stages, in each of which the outstation transmits a sequence at very low level and the basestation performs a correlation for each of the possible alignment positions, as described in the above mentioned application, but which is also applicable for very short sequences. The result of the first stage is that the basestation has acquired partial knowledge of the propagation delay to one of the outstations. The knowledge is partial in that only the remainder (f0) resulting from the mathematical division of the propagation delay by the length of the sequence used (s). For the purpose of resolving the conflict between several outstations attempting to attach simultaneously however, this information is used only as a reference marker for the later stages.

In each of the later stages the basic correlation procedure followed in the first stage is followed, but a modification is introduced in order that the outstation may transfer information so as to distinguish it from other outstations. Two methods of doing this are:

Shifting the sequence by a number of bit positions equal to a value which may be part of the information. The part of the information must be chosen so that the number of possible values does not exceed the length of the sequence, since otherwise an ambiguity will arise because this must result in one or more cases in which two values would result in indistinguishable sequences in view of the cyclic nature of the sequence used.

Inverting the sequence depending on one bit of the information. "Inverting" refers to the substitution of the values transmitted so that a '1' is transmitted in place of a '0' and vice-versa, as will be readily understood by those familiar with digital techniques.

Once the basestation has detected the correlation signal in these later steps it may extract the information which is implicit in the result which will be obtained in these later steps. By comparing the alignment position (f1) discovered on a later stage with that discovered on the first stage (f0) the value transferred by "shifting" is given by the formula $$(f1 - f0) \text{ modulus } s$$

The definition of the mathematical operator "modulus" is common knowledge, but for clarity, a suitable definition is that "a modulus b" is the unique integer value which is greater than or equal to zero and is less than b and is such that a is equal to that value added to an integral multiple of b.

The bit of information transferred by "inverting" the sequence may easily be deduced by the basestation as follows: the value is '1' if the correlator which was triggered reached the positive threshold of detection and '0' is the correlator which was triggered reached the negative threshold.

It has now been described how by multiple correlation stages, outstations may send to the basestation information as to their identity. Therefore, from the third stage onward, the basestation may instead of broadcasting a request for all outstations which may be attempting to begin communication to transmit, request that only those outstations which possess the identify portion which the basestation has deduced should do so. By this means, the number of outstations responding will be reduced on each stage. If sufficient stages are performed so that the outstations are able to send the whole of their identity information, then the outstation which survives all the stages must be unique. In addition, the basestation will know the identity of that outstation which it may use for addressing purposes.

During each stage many outstations may be transmitting a correlation sequence and the one which will be recognised; i.e. the one which causes the appropriate correlator to trigger first is significant to the operation of this process. If one outstation is transmitting at a stronger power then it is more likely to be recognised than the others. In the case when there are two or more dominant outstations whose received powers are similar, it is a matter of chance which will be recognised on each stage of the process. However, if different outstations are recognised then incorrect information about the identities will be deduced by the base station. Therefore, it will ask only those outstations with certain identity information to continue to transmit in later stages, where that information is bogus. Therefore no outstations will respond. This will be evident to the basestation which may start the whole process over again, and repeat this procedure until it is completed satisfactorily with responses received in each stage.

These methods of resolving conflict between several outstations can be combined with commonly available techniques, such as exponential back off, which is used on an ETHERNET LAN, for example, in which if an outstation fails to get through it will delay trying again in order to relieve congestion.

The basic process can be accelerated as will be apparent from the following. A characteristic of a PON system is that signals are received with a wide variation in signal strengths. This wide range applies to both the correlation signals and the normal traffic signals. It is a requirement that the strongest correlation signal be small compared with the noise level of the system, which must in turn be small compared with the weakest normal traffic signal. Since an outstation has no means of knowing the extent by which its correlation signal will be attenuated, it must in the basic process described in the above mentioned application transmit at an extremely low level. This means that correlation must be performed for long periods of time for results of sufficient confidence to be obtained.

The basic correlation process may be accelerated so that outstations may attach in less time by transmitting the correlation sequence first at a low power and then at a higher power. However, if this transmission is performed by a laser operating in the LED region of operation, then care must be taken to ensure that at the higher power level the transmitter is not driven into laser operation, a danger highlighted in FIG. 5. A safer method is to gradually increase the power either as a continuous increase or by many small increments so as to approximate to a continuous increase. This is ramping, further aspects of which are discussed below.

As will be appreciated, it is required to increase the power of transmission of the correlation sequence to an optimal level which is just below the point at which corruption of normal traffic may occur. Corruption is defined as increasing the Bit Error Rate (BER) above a permitted level, typically 1 bit error in $10^{-9}$ transmitted bits. The received power which will cause this corruption is related to two key factors:
1. The improvement in Signal to Noise (S/N) ratio of the receiver beyond that which is required to achieve the specified BER in the absence of a received correlation signal.
2. The number of outstations which may attempt to send correlation signals =simultaneously.

Figure 6:
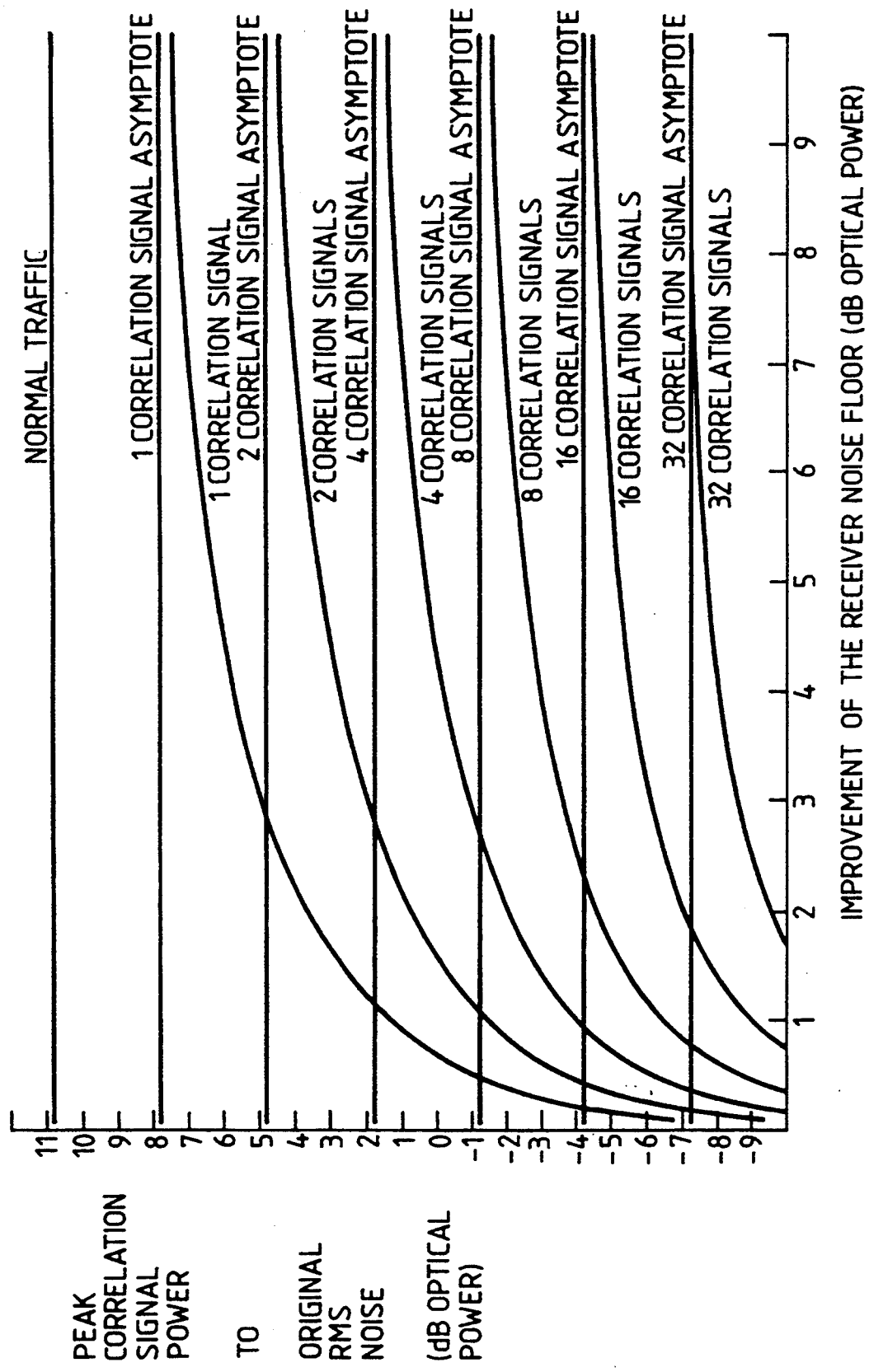
FIG. 6 is a graph of peak correlation signal power to original RMS noise (dB optical power) versus improvement of the noise floor of the receiver (dB optical power)

FIG. 6 shows a graph of peak correlation signal power to original RMS noise (dB optical power) against the required improvement in S/N ratio of the receiver (i.e. improvement in the noise floor of the receiver (dB optical power). It is assumed that the correlation signal consists of an equal number of zero and one values encoded using NRZ encoding (i.e. a zero is represented by no transmission and a one by transmission). Such an encoding scheme is well known to those of ordinary skill in the telecommunications art.

A selection of curves are given to illustrate the effect of different numbers of outstations attaching simultaneously. For example, if the S/N ratio of the receiver is 10.8 dB (optical power), this will give a BER of $10^{-9}$ in the absence of a correlation signal. If the S/N ratio is improved by 1 dB to 11.8 dB, then a single correlation signal with a peak power to original (unimproved) RMS noise level of $+1.2$ dB would be permitted if the BER was to remain at $10^{-9}$.

The transmitted power may be increased in steps, with each such increase being accurately controlled to a specified factor, for example 1 dB increments. Following each step increase, correlation is performed for a time period such that detection of the signal shall occur with a high probability (typically $1-10^{-9}$) if the received power is within one step size of the optimum level, but with a low probability of detection of signals of a lower, sub-optimal level. Thus the transmitted power level is set according to the received power level, which will inherently compensate for two independent effects:
1. Variable path loss between the basestation and outstations;
2. Variations in the characteristics of the transmitter and receiver electro-optics, which in practice vary widely with temperature and from device to device.

Figure 5:
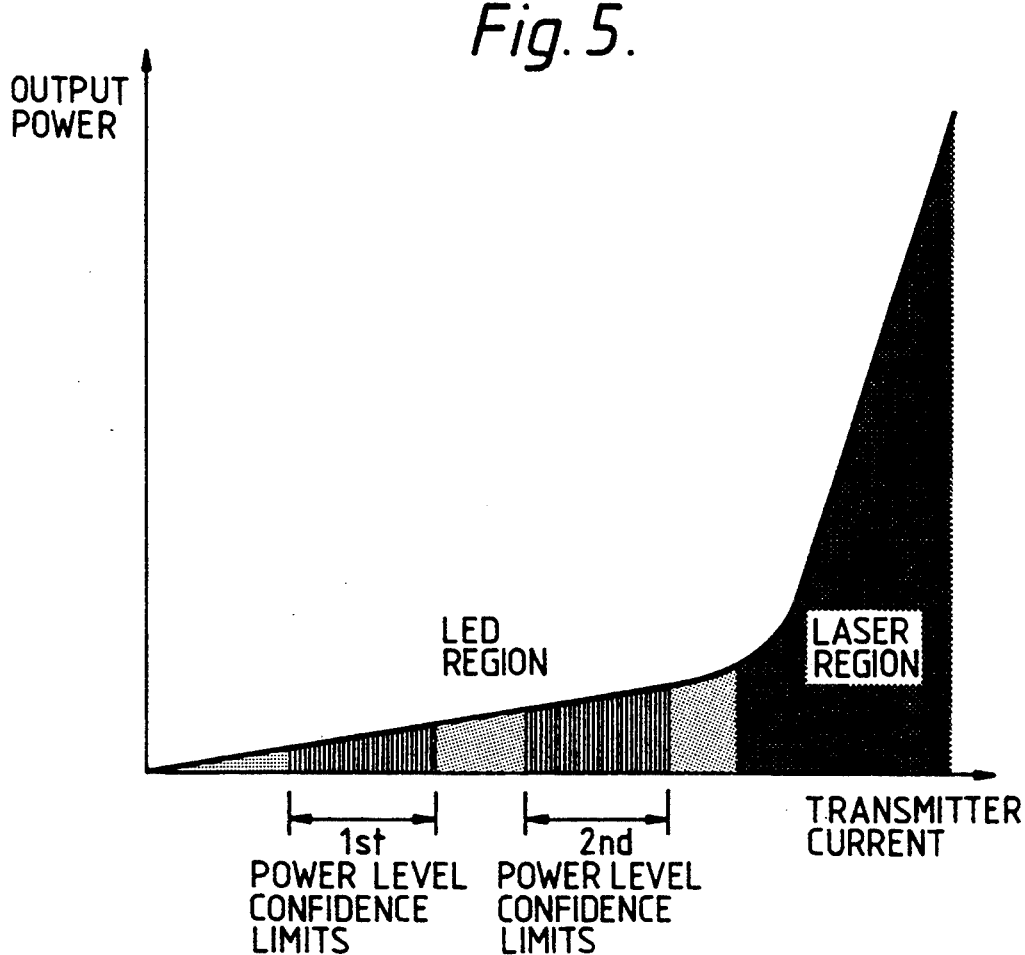
FIG. 5 is a graph of transmitter laser output power versus transmitter current and indicating two power level confidence limits.

The difficulty of achieving power increments of a constant factor over a wide range is readily appreciated from FIG. 5. The characteristics of a laser are such that at a critical point, operation transfers from a region of LED operation to laser operation, within which latter the transmitted power increases much more rapidly with drive current than in the LED region. Therefore a different method of controlling the step increases is required in each region of operation.

In the LED region, the transmitted power is, typically, so low that direct measurement is impractical. Therefore, the technique used is to increase the drive current on each step by a constant factor; for example corresponding to one dB steps. Assuming that there is a linear relationship between drive current and output power, this will result in the signal power increasing by a similar factor. The linearity of the relationship may be improved by applying a constant d.c. bias current to the transmitter which is then modulated by a signal or drive current which may be increased in steps as described above.

At higher powers, close to and within the region of laser operation, the power increments may be controlled by direct measurement of the power by means of a detector within the transmitter. Typically, this detector will be a photo diode incorporated into the back facet of the laser package, Thus an increase in power of the desired amount may be achieved without dependency on the linear relationship between drive current and power.

A frequent requirement of attachment mechanisms within telecommunications systems is minimisation of the elapsed time. In the following there is described a technique which improves the performance in this respect, since on each power increment detection of the signal relies on the correlation result obtained in the previous steps as well as in the current step. This detection will be more reliable for a given period of correlation on each step and this period may therefore be reduced to a level at which the same level of confidence of detection is available as in the original system.

Figure 7:
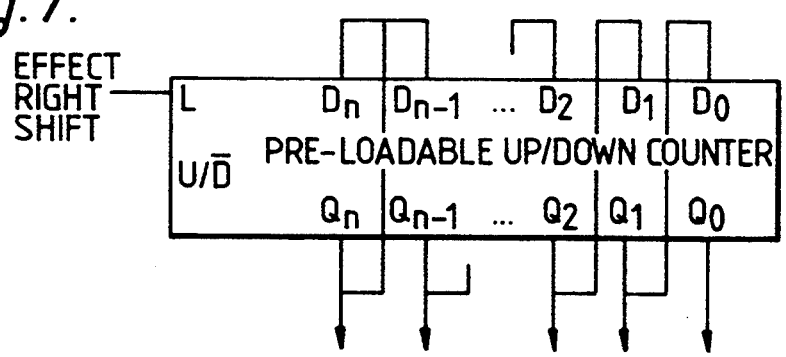
FIG. 7 illustrates a correlator with a decaying integration function.

The correlator described in GB Application No 9223740.3, referred to above, with reference to FIG. 6 is functionally an up/down counter. Here we propose use of an enhanced counter which supports the additional feature of an "Arithmetic Right Shift" (ARS). This function and its realisation in digital hardware is commonplace and is readily apparent to one of ordinary skill in digital design. On the commencement of correlation for each step, the ARS operation is applied in place of resetting the correlator value to zero as occurred in the scheme of GB Application No 9223740.3. Thus on completion of each step, the correlator value is equal to the sum of the correlation result for the current step, plus half the correlation result for the previous step, one quarter of the result from the second earlier step, and so on. Thus the correlator has been enhanced to perform a decaying integration function. A digital circuit to realise such a correlator is illustrated in FIG. 7.

We now consider correlation implementation and possible simplifications. The basic process of the above mentioned application and the modifications discussed above require that digital electronic circuits be constructed which will perform the correlation of signals at the basestation by processing each bit of information as it arrives. Whilst this is possible and practical, we now describe a modification to the means envisaged previously by which such circuitry may be realised much more easily. This is achieved by modifications which allow the circuit to operate at a lower rate while achieving the same object.

Figure 8:
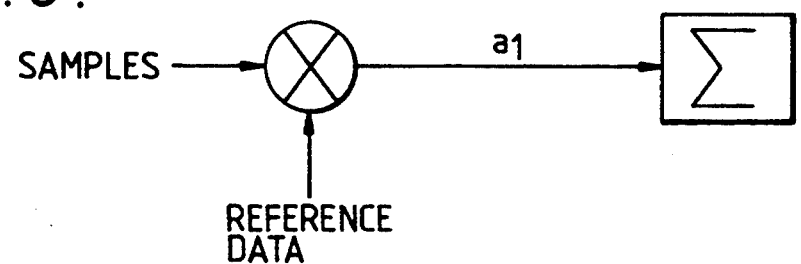
FIG. 8 shows the basic correlator configuration discussed in the above-mentioned co-pending application.

The initial idea for a correlator for use in PON Marshalling (referred to as scheme A) is described in FIG. 8. A number of variations will be considered below which have the advantage of using a lower clock rate for some of the circuitry at the expense either of a reduction in performance or of an increase in complexity.

Scheme B is illustrated in FIG. 9. The received data is correlated with the reference data and groups of n match results are combined in a pre-integration stage. The result produced by this stage is a single bit which is a 1 if more than n/2 matches occur. This is effectively truncation or rounding of the numerical value.

The characteristics of this configuration are:
there must be a separate instance of the correlator and pre-integration stage for each alignment position of the sequence.
the sequence may be transmitted either at the same clock rate as in scheme A or at a rate reduced by a factor of n. This has no effect on performance, since beyond point bO, only the number of matches is of interest.

Scheme C is illustrated in FIG. 10. The pre-integration stage outputs a single bit value for each group of n samples of the received data, which is the bit value which occurs most often within the group. This bit value is correlated with a reference value and a cumulative sum of the number of matches is maintained.

The characteristics of this configuration are:
only one pre-integrator is required for a group of correlators, since it determines the value of incoming bits which is independent of the sequence alignment.
the sequence must be transmitted at a clock rate reduced by a factor of n so that all n samples in a group are transmitted with the same bit value.
the phase of transmission and reception must be the same, so that all n bits which the pre-integrator combines have the same bit value. In a typical system this phase relationship will arise arbitrarily, and a means must be provided to correct if it necessary. An example of such means would be for the outstation to change its phase by one bit whenever the process should restart after a failure.

Schemes D and E are variations of schemes B and C respectively, in which the pre-integrator outputs a multi-valued signal representing the number of 1's input. The main integrator must add this multi-valued signal to the correlation sum.

The performance of Scheme B will now be considered with the object of demonstrating that the approximation which results from converting the information content of the n incoming samples into a single bit value is modest, and the exchange of this loss in performance with the reduction in the speed at which the circuitry is required to operate by a factor of n will be of great value to one desiring to make and use this invention. Suppose that during a correlation process, nSample samples are received, resulting in nSample match results being generated at point bO. Following the pre-integration stage in which n samples are combined nBit values are produced at point b1. Then nSample=nBit*n Let p be the probability that the signal will predominate over the noise. Let $S_n$ be the probability that a bit will be received correctly for a given value of n. In the case where no pre-integration stage is employed then a proportion p of the bits will be correct and a further $(1-p)/2$ will be correct by chance. Combining these quantities, $$S_1 = (1+p)/2$$

The probability that r bits out of n will be correct is $$^nC_r * S_1^{r} * (1-S_1)^{n-r}$$

and therefore the probability that a bit will be received correctly, Sn is given by $$S_n = 1 - \sum_{r=0}^{n/2} {}^nC_r * S_1^{r} * (1 - S_1)^{n-r} * \begin{cases} 0.5 & \text{if } r = n/2 \\ 1 & \text{if } r \neq n/2 \end{cases}$$

or alternatively $$S_n = \sum_{r=0}^{n/2} {}^nC_r * S_1^{n-r} * (1 - S_1)^{r} * \begin{cases} 0.5 & \text{if } r = n/2 \\ 1 & \text{if } r \neq n/2 \end{cases}$$

The special treatment of the term where r=n/2 arises from the fact that in this case it is indeterminate whether the bit is correct or not, so an arbitrary decision must be made. However this is done, it will be correct in half the number of instances.

While $S_n$ increases as n increases, the magnitude and standard deviation of the correlation sum decreases. The performance parameter of interest is the time taken, which is proportional to nSamples, for the required confidence level to be reached. Suppose for example that the confidence level has been chosen such that after the maximum integration period, the correlation sum is six standard deviations from the mean. Then, $(S_n - 0.5)*nBit = 6*\text{sqrt}(nBit/4)$ Rearranging, $nBit = (3/(S_n - 0.5))^2$ Expressing in terms of the number of samples, $nSample = 9 * n/(S_n - 0.5)^2$ The Table in FIG. 11 shows how nSample increases with n. Note how performance is degraded with even n, due to the effect of the indeterminate case. A typical signal to noise ratio of −52.3 dB (electrical) is assumed for this example.

As already implied above, a common problem within a telecommunications network with a star topology, as exemplified by a PON in which the hub of the star represents the base station and the outstations the points of the star, is that on commencement of communications, the basestation cannot address each outstation individually and if outstations respond to broadcast invitations to transmit, their transmissions will interfere and none will be correctly received. A third specific method for resolving the conflict when multiple outstations begin transmission simultaneously will now be described. A prerequisite is that each outstation shall be programmed on manufacture with an "identity" consisting of a unique pattern of bit values. Typically, a long pattern will be used so that sufficient combinations are available to give each manufactured unit a unique code. The principle of the method is that by means of the technique described, all of the competing outstations present their identities and the basestation will deduce one of the identities. It may then begin direct communication with one outstation by means of "addressing" it. The identity acquisition technique is then reapplied to deduce one further identity, and so on, until the basestation has knowledge of each individual identity and may communicate with each outstation individually.

A procedure is followed to determine each bit in turn, as illustrated in FIG. 12. Initially, following entry to the flow at point A, the leftmost bit of the identity is determined, then the second, and so on until all are determined. Before each step the correlators are reset to a value of zero. On each step, the outstation obeys commands to transmit a correlation signal if its own identity matches the specification given in the command. The specification will specify a variable number of bits within the identity, depending upon the stage of the procedure. Thus each command specifies two quantities, the "content" and the "length".

Each bit is deduced individually by a procedure which is explained below for one particular bit as an example. Suppose that the first three bits have been determined as bit values a, b and c. Then the fourth bit is determined by a procedure consisting of the following steps:

1. The commands issued specify

"Content"=abc1xxxx ... and "Length"=4

2. If a positive result is achieved then the correlation may be repeated to give improved confidence in the result. If a positive result is again obtained, then the procedure continues so as to determine the next bit, assuming that the fourth bit is 1. If a negative result is achieved then commands are issued with "Content"=abc0xxxx ... and "Length"=4

4. If a positive result is achieved then the procedure continues so as to determine the next bit, assuming the fourth bit is 0.

5. If a negative result is achieved then return to step 1, but if ramping has been employed, on the first command a power increment is specified. However, a time-out mechanism must be provided such that if this occurs many times, implying either than an earlier bit has been incorrectly deduced or the outstation has ceased to attempt connection, then the Byte Correlation procedure shall be restarted (exiting from the flow diagram at point C).

Once a positive correlation result has been obtained with all bits of the identity specified (exiting from the flow diagram at point B), then the basestation may instruct the outstation individually to transmit at a different time from other outstations whose identities are known, in order that their transmissions may be received separately and therefore intelligibly. In other words, once the identify of an outstation is known to the basestation, the principle of TDMA may be applied.

In correlator Scheme C referred to above with reference to FIG. 10, there is a requirement that the phase of transmission and reception must be the same. An example is given of a means by which the byte phase may be corrected, namely by requiring an outstation to change its phase by one bit whenever the process should restart after a failure. An improved means will now be described in which the correct phase is determined as a by-product of acquiring the unique identity by the method described with reference to FIG. 12.

The bit-wise alignment of the received correlation sequence with the serial-to-parallel conversion performed is initially arbitrary. By following the procedure set out below, there is a high probability that correct alignment will be achieved once the unique identify of the outstation is known.

Figure 13A:
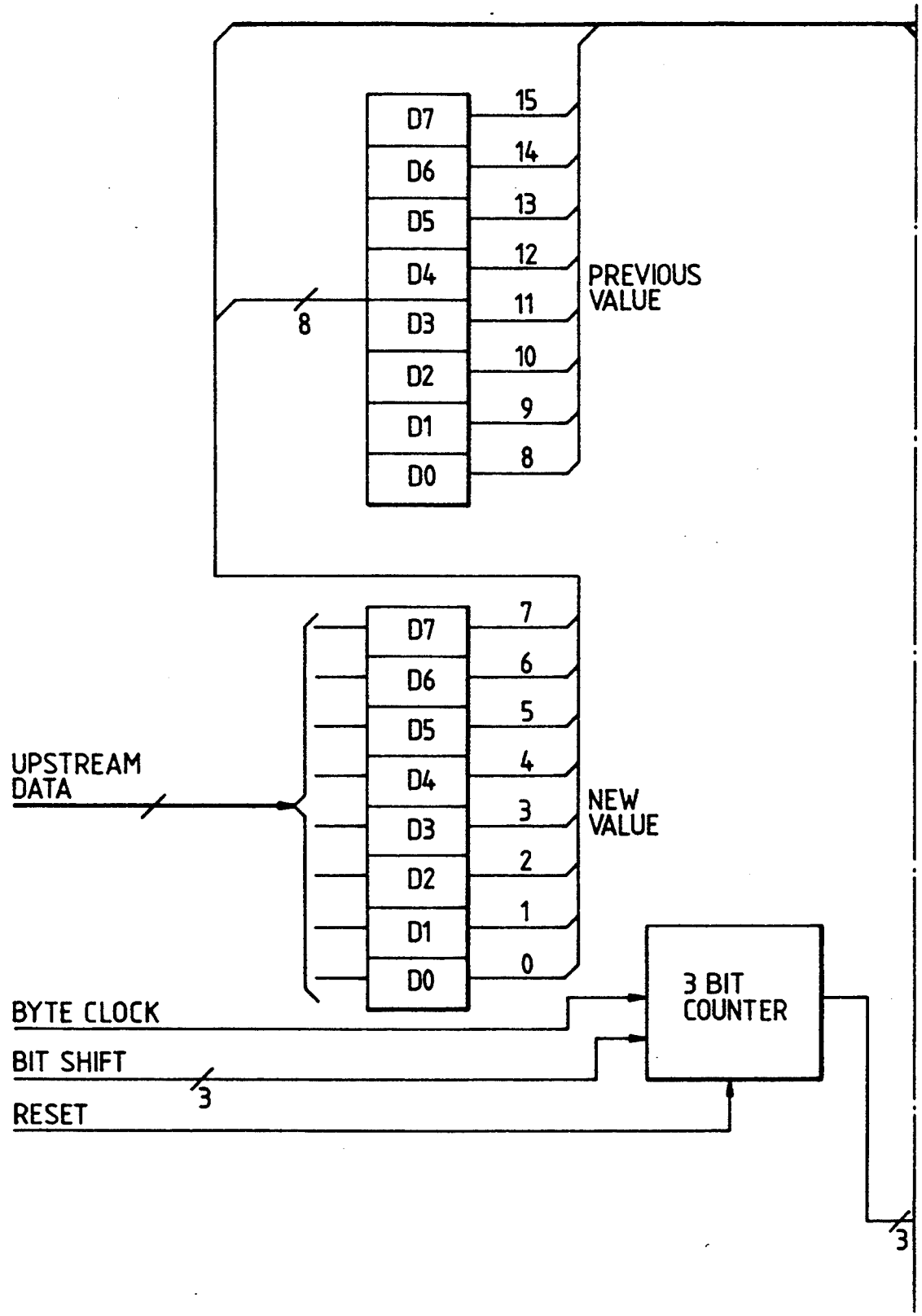
Figure 13:
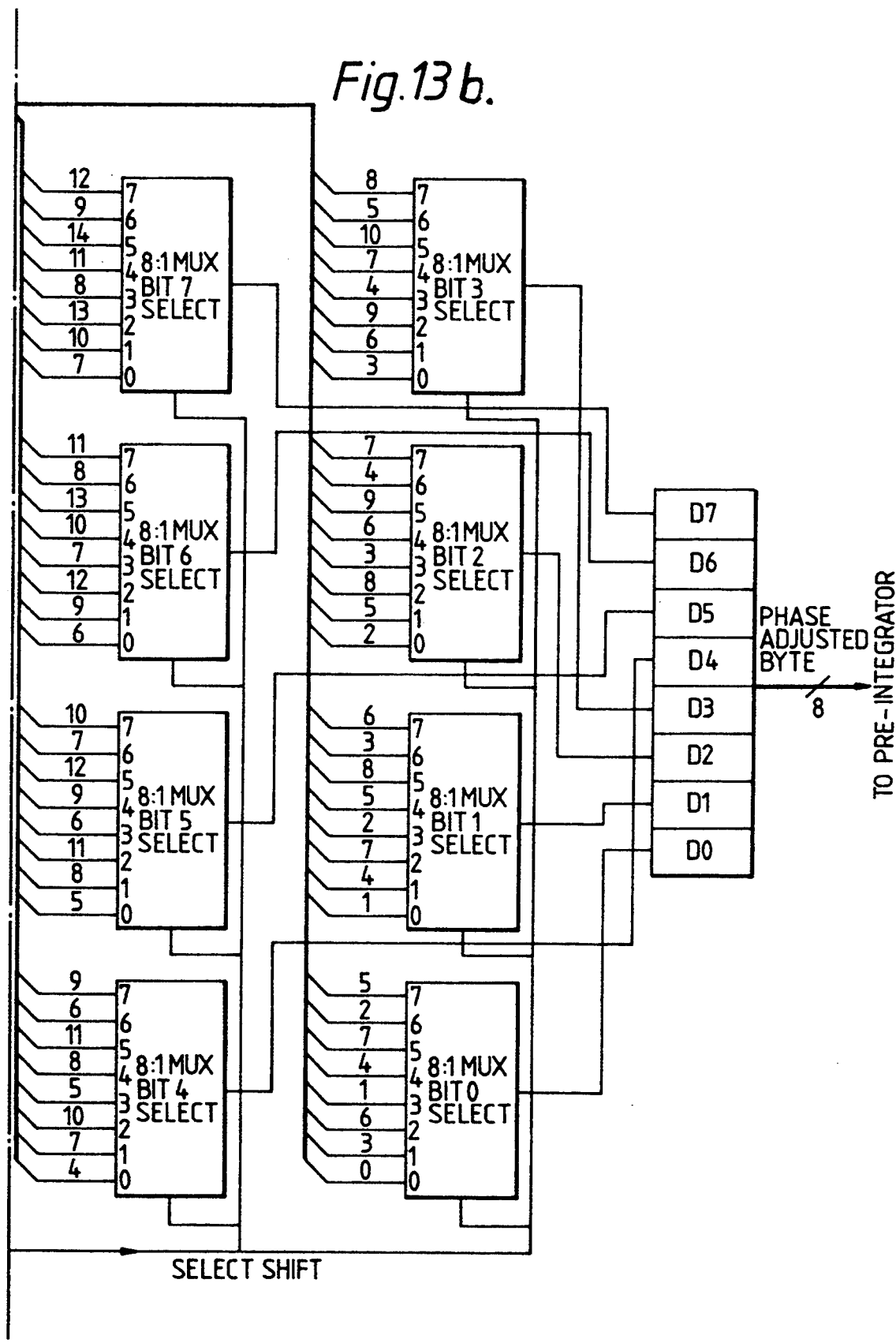

The pre-integrator of FIGS. 9 and 10 (Schemes B and C) is preceded by a byte phase adjuster which adjusts the alignment by 0 to 7 bit positions according to the value of a signal named Select Shift. A circuit to implement this function is shown in FIG. 13.

If the byte phase alignment is incorrect, then two adjacent correlators will be caused to correlate rather than a single correlator. If the alignment is close to anti-phase alignment (misaligned by half a byte), then which of the two correlators will reach a given threshold first is a matter of chance, with each outcome having an equal probability. For phase alignments between in-phase and anti-phase, the probabilities are different. The principle we are now employing is that if the probabilities are sufficiently well matched that a different correlator is triggered on acquiring any of the bits of the unique identity, then an alternative phase position is used from then on. The precise definition of the algorithm is as follows.

When a positive result is obtained for even values of the "Length", then the identity of the; correlator which reached the positive threshold differs from the identity of the correlator which reached the positive threshold on the previous step, when the value of "Length" was odd, then a three bit phase shift is effected. This consists of adding three (modulo 8) to the value of select shift supplied to the byte phase adjuster. The value of three is chosen assuming that eight bit words are integrated by the pre-integrator. If the phase alignment: is near to anti-phase, then a single correction will take it near to in-phase. However, since 3 and 8 are relatively prime, all phase positions will be covered by 24 corrections. Whilst eight bit words have been specifically described, the scheme can equally well be applied to words of other sizes. The number of bits correction should be the value which is closest to half the word size, yet relatively prime to the word size.

A basic correlation scheme is illustrated in FIG. 5 of GB Application No 9223740.3 and includes a threshold detector. As discussed above a frequent requirement of attachment mechanisms within telecommunications systems is minimisation of the elapsed time. The threshold detector referred to above compares the count value of the correlator against a fixed value. This value must be calculated so that if integration proceeds for the maximum period, then the probability that in the absence of a signal, the threshold will be exceeded due to random fluctuations in the correlator value alone will be constrained to a required minimum, C, typically 0.001. If the threshold is set in this way for the maximum integration period, then it will provide an unnecessarily great degree of protection against spurious detection in the early stages of the correlation step.

A theoretically ideal threshold detector would check for a varying threshold T(n) where n is the number of bits (in bytes) correlated, defined by the following equation $$\text{Probability } (S(n) > T(n)) = C$$

where C is the level of confidence required and S(n) is the correlation count in the absence of a signal. Since, in the absence of a signal, each bit (or byte) is a Bernoulli Trial, then the distribution of S will be normal with standard deviation (sigma) sqrt(n)/2. This approximation is a standard mathematical technique. Therefore, where U is the standard normal deviate $$P(U > T(n)/\text{Sigma}) = C$$

If U1 is the value such that Probability (U>U1)=C (obtained from statistical tables commonly employed by those practising the design of equipment which is probablistic in nature)

$$T(n)/\text{sigma} = U1$$

$$T(n) = U1 * \text{sigma}$$

$$T(n) = U1 * \text{sqrt}(n)/2$$

Figure 14:
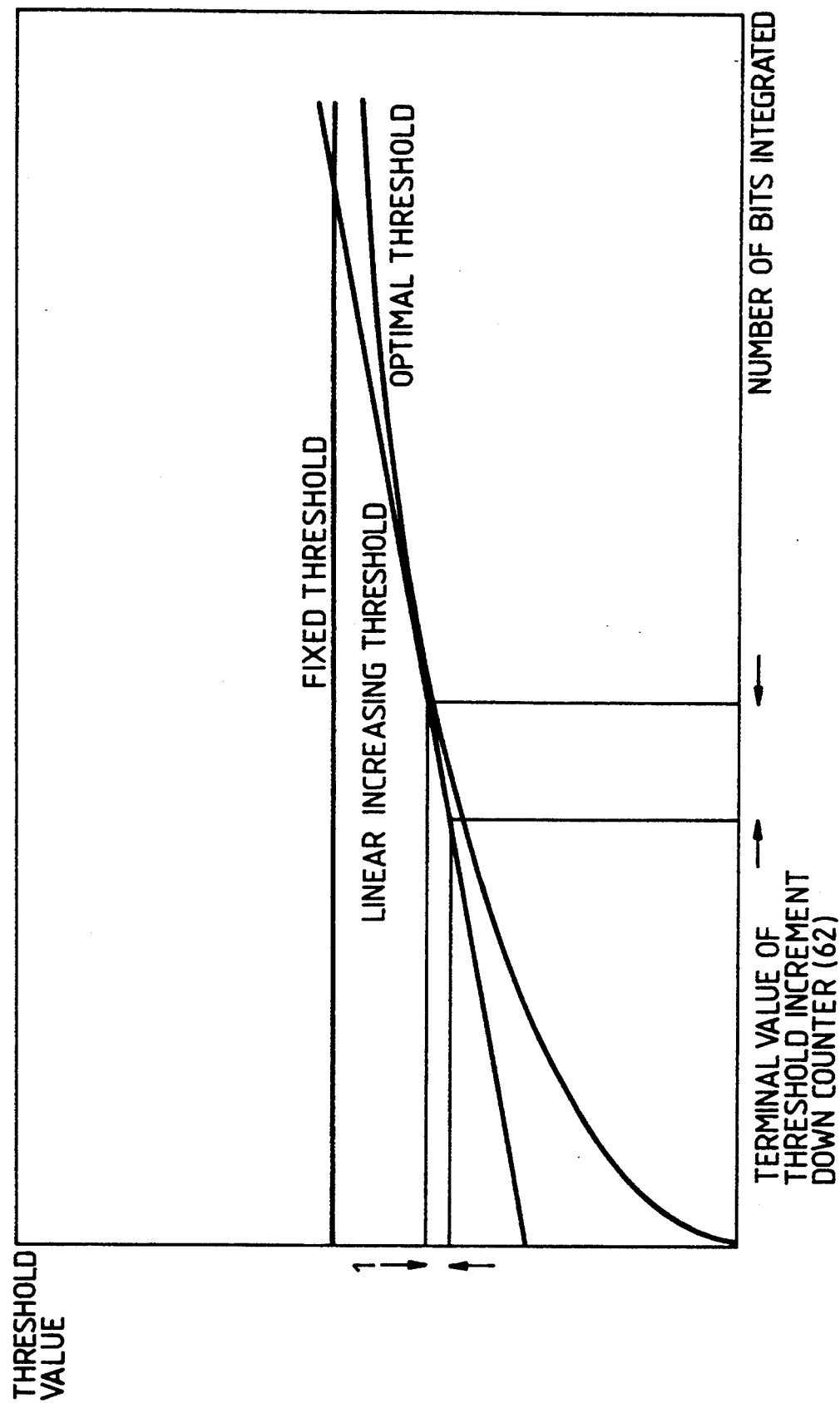
FIG. 14 is a graph of optimal, linear increasing and fixed thresholds against integration period.
Figure 15:
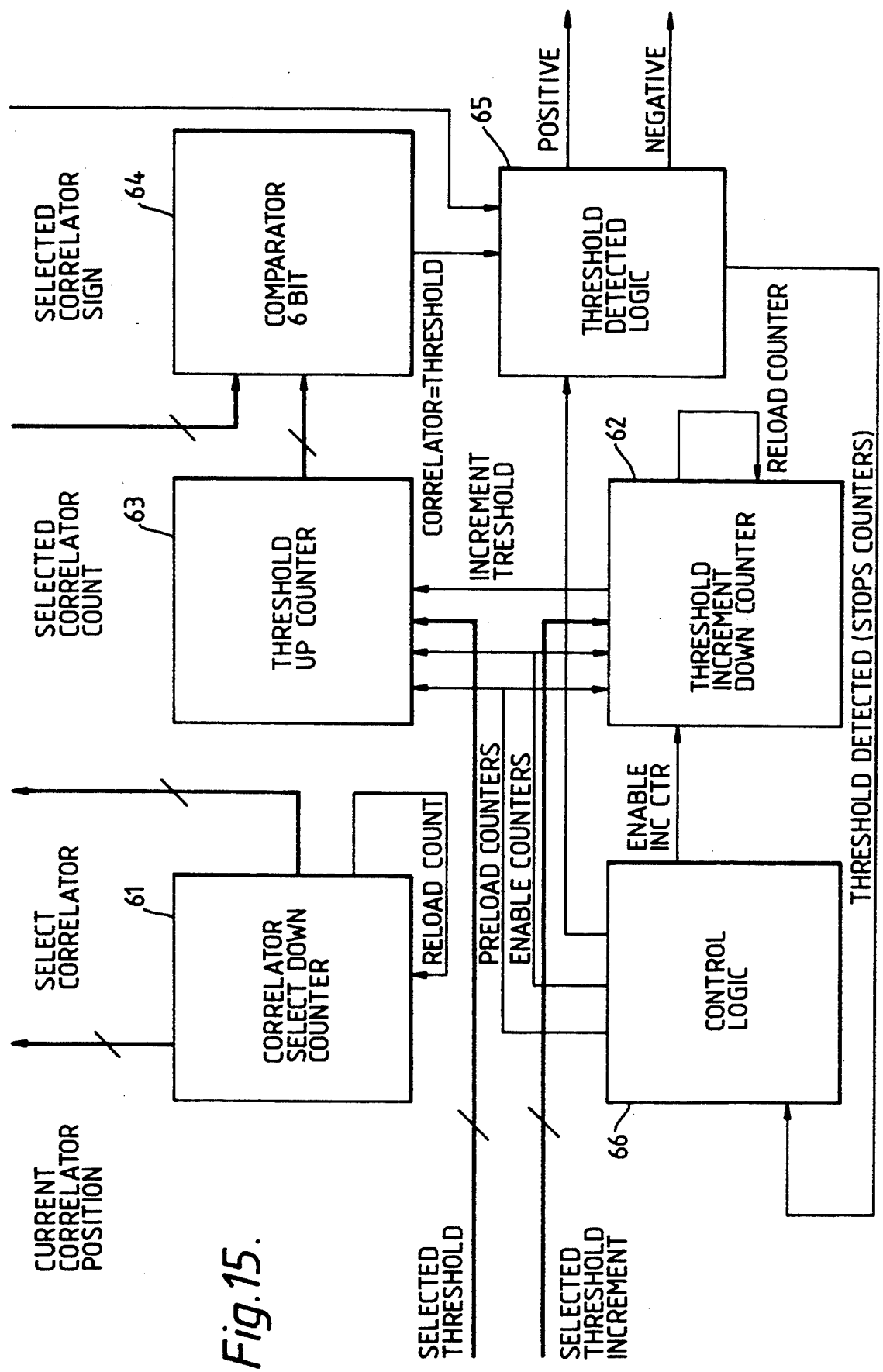
FIG. 15 is a circuit for realising an incrementing threshold detector.

Whilst a threshold detector which checked the correlator value for equivalence to the varying quantity T(n) would offer optional performance in terms of both the speed with which the result might be obtained and the confidence in the result obtained, a threshold detector would typically be realised in digital hardware so as to approximate this function while effecting economies in design. One such approximation T1(n) would be a linear approximation as illustrated in FIG. 14 which is a graph of optimal, linear increasing and fixed thresholds against integration period. A circuit to realise such a linearly increasing threshold is illustrated in FIG. 15.

The circuit comprises a number of counters which are standard binary up or down counters. When one of these counters reaches it terminal value (0 for a down counter, maximum value for an up counter) then it automatically reloads (0 for a down counter, maximum value for an up counter). One such counter 61, the correlator select down counter, is a continuously running up counter which selects each correlator in turn and has a maximum value of the number of correlators employed. While correlation is in progress, the threshold increment down counter 62 counts the number of bits or bytes correlated until the period between "threshold increments" is reached. When this occurs the threshold up counter 63 is incremented. The value of this is compared with the correlator count by a comparator 64. The block threshold detected logic 65 determines whether the correlator has reached a positive or negative threshold. The process is controlled by control logic 66.

We claim:

1. A method for marshalling an additional outstation of a time division multiple access (TDMA) telecommunications system including a basestation and a plurality of outstations, the method being characterised by the steps of transmitting from the base station instructions for any additional outstation to transmit, transmitting from the additional outstation a sequence at a level below the noise sensitivity of a receiver of the basestation, detecting said sequence at the basestation, discriminating the phase of the detected sequence, said detecting and discriminating being carried out by a correlation process, using the discriminated phase to determine the loop delay to the additional outstation and thereby required phase offset instructions and transmitting the phase offset instructions to the additional outstation whereby to cause said additional outstation to align its transmission in a respective transmission window, wherein the sequence is a short length sequence, and wherein the instructions transmitted by the basestation include a frame word from which frame boundaries and a time reference are deducible by the additional outstation.

2. A method as claimed in claim 1, wherein the correlation process involves a binary division search.

3. A method as claimed in claim 1, wherein the correlation process involves a lowest common multiple method.

4. A method as claimed in claim 3, wherein the sequence is comprised of a plurality of different short length sequences which are transmitted consecutively as one sequence and the correlation process is performed on each of the individual short length sequences and yields values comprising the remainders resulting from a mathematical division of the delay by the number of bits in the individual short length sequences, and including the step of deducing the delay from the individual remainders.

5. A method as claimed in claim 2, wherein the correlation process yields a value for the loop delay corresponding to certain value plus an unknown integral multiple of the period of the short sequence and wherein a number of successive correlations are performed upon the short sequence and the loop delay value is deduced from the resultant obtained values.

6. A method as claimed in claim 1 and including performing a conflict resolution process in the event that two outstations begin transmitting simultaneously.

7. A method as claimed in claim 6, wherein the correlation process is a multi-stage process and in each stage after the first one of said two outstations transfers identity information to the basestation by modulation of the sequence in order to distinguish it from the other outstation.

8. A method as claimed in claim 1 and including accelerating the marshalling process by transmitting the sequence from the outstation at increasing power levels and performing the correlation at each level.

* * * * *